United States Patent [19]

Funabiki et al.

[11] Patent Number: 5,147,842
[45] Date of Patent: Sep. 15, 1992

[54] EXHAUST GAS-PURIFYING CATALYST AND PROCESS FOR PREPARATION THEREOF

[75] Inventors: Masaki Funabiki, Mishima; Kunihide Kayano; Teiji Yamada, both of Numazu, all of Japan

[73] Assignee: N.E. Chemcat Corporation, Tokyo, Japan

[21] Appl. No.: 655,415

[22] PCT Filed: Jun. 8, 1990

[86] PCT No.: PCT/JP90/00752
§ 371 Date: Feb. 11, 1991
§ 102(e) Date: Feb. 11, 1991

[87] PCT Pub. No.: WO90/14887
PCT Pub. Date: Dec. 13, 1990

[30] Foreign Application Priority Data

Jun. 9, 1989 [JP] Japan .................. 1-145491

[51] Int. Cl.$^5$ .............. B01J 21/04; B01J 21/06; B01J 23/10; B01J 23/40
[52] U.S. Cl. .................. 502/304; 423/213.5
[58] Field of Search .............. 502/304; 423/213.5

[56] References Cited

U.S. PATENT DOCUMENTS

| 4,316,822 | 2/1982 | Fujitani et al. ............... 252/462 |
| 4,367,162 | 1/1983 | Fujitani et al. ............... 252/443 |
| 4,806,519 | 2/1989 | Chiba et al. ............... 502/304 X |

FOREIGN PATENT DOCUMENTS

| 0125565 | 11/1984 | European Pat. Off. . |
| 0142858 | 5/1985 | European Pat. Off. . |
| 0313434 | 4/1989 | European Pat. Off. . |
| 0337809 | 10/1989 | European Pat. Off. . |
| 61-222539 | 10/1986 | Japan . |
| 63-77544 | 4/1988 | Japan ................ 423/213.5 |
| 63-88040 | 4/1988 | Japan . |
| 63-116741 | 5/1988 | Japan . |
| 64-39824 | 3/1989 | Japan . |
| 64-58347 | 3/1989 | Japan . |

*Primary Examiner*—W. J. Shine
*Attorney, Agent, or Firm*—Wenderoth, Lind & Ponack

[57] ABSTRACT

This invention relates to a purifying-catalyst for exhaust gas emitted from internal combustion engines such as automobiles, and the object is to provide a catalyst which exhibits excellent exhaust gas purification performance at lower temperature compared to usual catalysts, even after high temperature aging, and a process for preparation thereof. This object has been attained by an exhaust gas-purifying catalyst which has a structure to have at least two catalyst component-containing layers on a support having a monolithic structure, and wherein, as the catalyst components, the inner catalyst component-containing layer contains at least one element of the platinum group, activated alumina and cerium oxide, the outer catalyst component-containing layer contains at least one element of the platinum group, activated alumina and optionally a zirconium compound, and at least one of the inner catalyst component-containing layer and the outer catalyst component-containing layer further contains a coprecipitated ceria-stabilized zirconia.

28 Claims, 3 Drawing Sheets

FIG. 1 CHANGE IN CRYSTALLINE STRUCTURE BETWEEN ZIRCONIUM OXIDE AND THE COPRECIPITATED CERIA-STABILIZED ZIRCONIA BY THE X-RAY DIFFRACTION METHOD

○ METASTABLE TETRAGONAL SYSTEM
● MONOCLINIC SYSTEM

FIG. 2

CHANGE OF THE SPECIFIC SURFACE AREA OF THE COPRECIPITATED CERIA-STABILIZED ZIRCONIA AS A FUNCTION OF AGING TEMPERATURE
AGING TIME : 4 HRS IN AIR IN AN ELECTRIC FURNACE

FIG. 3  COMPARISON OF OXYGEN STORAGE CAPACITY BY TEMPERATURE PROGRAMED REDUCTION MEASUREMENT METHOD
FEED GAS : 5% HYDROGEN, 95% ARGON (50ml/min)
PROGRAM RATE : 10°C/min

EXHAUST GAS-PURIFYING CATALYST AND PROCESS FOR PREPARATION THEREOF

TECHNICAL FIELD

This invention relates to purifying catalysts for exhaust gas emitted from internal combustion engines such as automobiles and a process for preparation thereof. More detailedly, this invention relates to catalysts which exhibit excellent exhaust gas purification performance at lower temperature compared to usual catalysts and a process for preparation thereof.

BACKGROUND ART

Elements of the platinum group such as platinum and rhodium, and cerium oxide having an oxygen storage function for enhancement of their activity at low temperature are mainly used now as catalytic converter to simultaneously remove hydrocarbons (HC), carbon monoxide (CO) and nitrogen oxides (NOx) in exhaust gas exhausted from internal combustion engines such as automobiles.

However, it is said that in catalysts containing an element of the platinum group and cerium oxide the oxygen storage function of cerium oxide strikingly lowers at a high temperature exposure above 800° C. and thus the catalysts are liable to deteriorate at those temperature. Thus, many methods have been disclosed comprising adding oxides of alkaline earth elements, or zirconium compounds for the purpose of inhibiting crystallization of cerium oxide and preserving its oxygen storage function (for example, Japanese Laid-Open Patent Publication Nos. 58347/1989 and 116741/1988).

Further, in the latest catalytic converter, catalysts having a two or more-layer structure and containing rhodium in the outer layer began to be used for effective utilization of expensive rhodium and are becoming the main stream. It is known in these catalysts that it is effective to add zirconium oxide for prevention of lowering of the catalytic performance due to interaction of rhodium with alumina. Further, in these catalysts, it is considered that the catalytic performance is enhanced by interaction between rhodium and zirconium oxide (for example, Japanese Laid-Open Patent Publication Nos. 222,539/1986 and 88,040/1988).

However, when zirconium oxide is exposed to high temperatures, its crystallite structure changes from the metastable tetragonal system having a catalytic activity to the inactive monoclinic system, contribution of rhodium and zirconium oxide to catalytic performance due to their interaction diminishes, and the catalytic performance is lowered. At present there is no disclosure about a catalyst to stabilize zirconium oxide in the catalyst and preserve the interaction between rhodium and zirconium oxide.

DISCLOSURE OF INVENTION

In this invention, it was aimed at to develop a catalyst which solves the above problems of the prior art and exhibits an excellent exhaust gas purification performance at lower temperature even after high temperature aging.

As a result of vigorous study for solution of the above problems, the present inventors found that it is extremely effective for enhancement of the activity of exhaust gas-purifying catalysts at low temperature after high temperature endurance to combine a coprecipitated ceria-stabilized zirconia (cerium oxide-stabilized zirconium oxides prepared by the coprecipitation method) having a specific oxygen storage performance as well as heat resistance with a usual catalyst containing at least one element of the platinum group, activated alumina, cerium oxide and optionally a zirconium compound.

Further, they found that it is more effective to add this coprecipitated ceria-stabilized zirconia to the outer layer of a catalyst having a structure consisting of at least two catalytic component (active component)-containing layers, and completed this invention.

This invention is detailedly described below.

In the invention, addition of a ceria-stabilized zirconium coprecipitated oxide gave a desirable result for enhancement of the activity at low temperature after high temperature aging.

Figure 1:
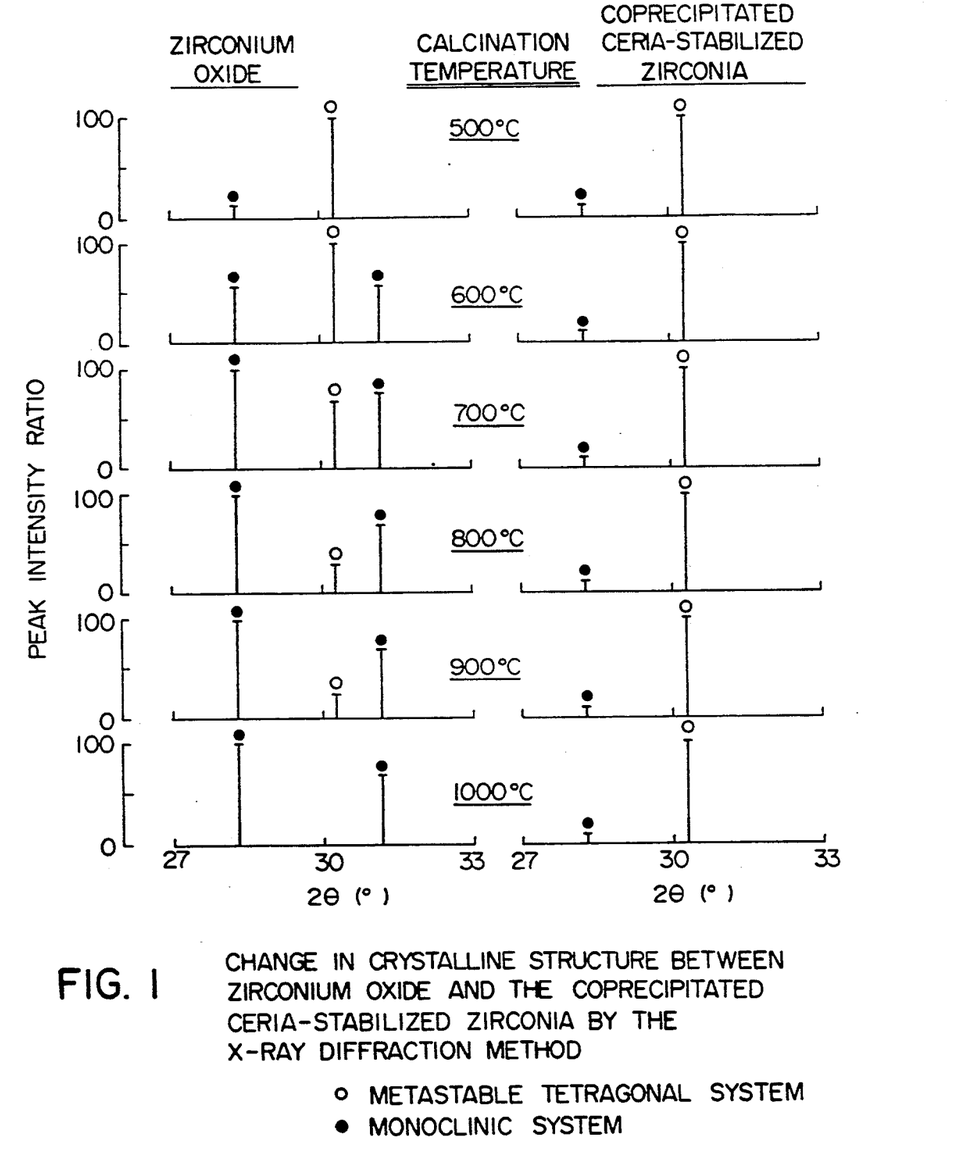
FIG. 1 is a drawing showing change in crystalline structure between zirconium oxide and the coprecipitated ceria-stabilized zirconia by the X-ray diffraction method.

As shown in FIG. 1, the structure of zirconium oxide changes from the metastable tetragonal system to the monoclinic system as the temperature becomes higher, whereas a coprecipitated ceria stabilized zirconia prepared by the coprecipitation method preserves the structure of the metastable tetragonal system having a catalytic activity even after high temperature aging.

Figure 2:
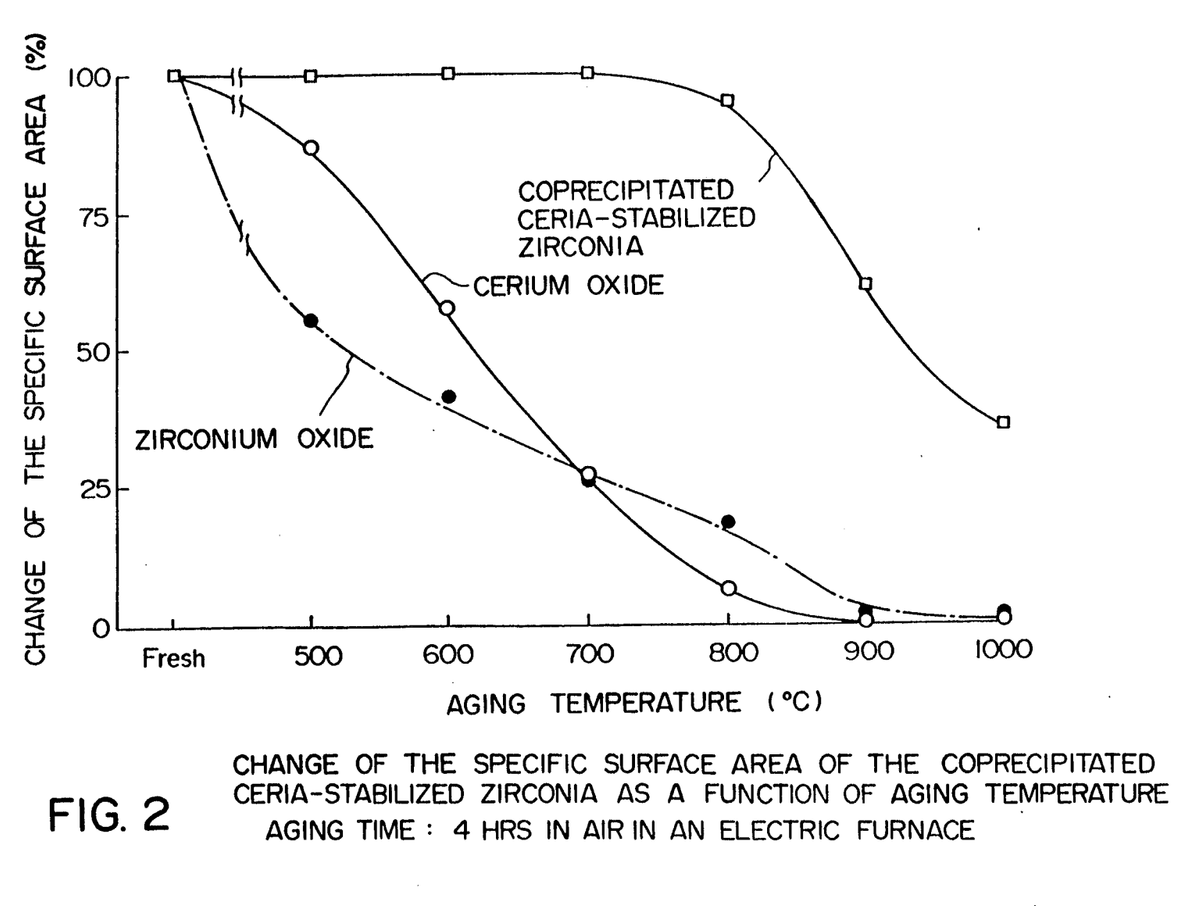
FIG. 2 is a drawing showing the change of the specific surface area of the ceria-stabilized zirconia as a function of aging temperature.

Further, as shown in FIG. 2, this coprecipitated ceria-stabilized zirconia has a small decrease ratio of the specific surface area and has such heat resistance that the oxide has a surface area of 30 $m^2/cm^3$ or more even after 900° C. aging.

Figure 3:
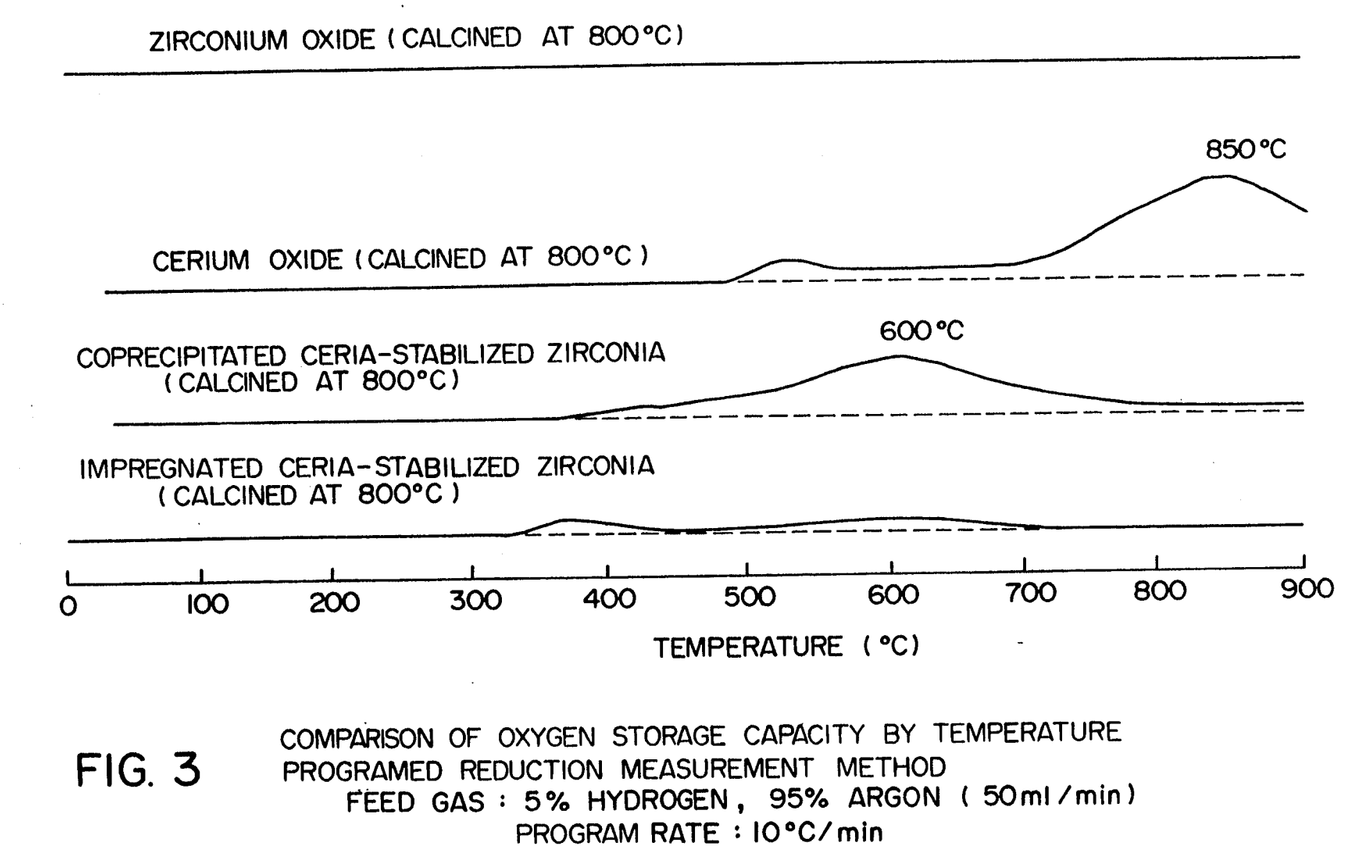
FIG. 3 is a drawing showing the oxygen storage ability of zirconium oxide, cerium oxide, the coprecipitated ceria-stabilized zirconiam, and the impregnated ceria-stabilized zirconia for comparison by the temperature programed reduction (TPR) measurement method.

FIG. 3 compares the peak positions of active oxygen species (oxygen storage ability) of a coprecipitated ceria-stabilized zirconia, a impregnated ceria-stabilized zirconium, cerium oxide and zircoium oxide respectively after calcination at 800° C. determined by the temperature programed reduction (TPR) measurement method. As shown in FIG. 3, the coprecipitated ceria-stabilized zirconia, i.e. cerium oxide-stabilized zirconium oxide prepared by the coprecipitation method exhibits an oxygen storage ability utterly different from those of the impregnated ceria-stabilized zirconia, i.e. cerium oxide-stabilized zirconium oxide prepared by the impregnation method, to say nothing of cerium oxide and zirconium oxide. The catalyst of the invention was completed by combination of both the stabilized zirconium having a specific oxygen storage ability and cerium oxide hitherto being known and having an oxygen storage ability.

[A The catalyst of the invention having at least two catalyst component-containing layers The exhaust gas-purifying catalysts of the invention is an exhaust catalyst to have at least two catalyst component-containing layers on a support having a monolithic structure, and wherein, as the catalyst components, the inner catalyst component-containing layer contains at least one element of the platinum group, activated alumina and cerium oxide, the other catalyst component-containing layer contains at least one element of the platinum group, activated alumina and optionally a zirconium compound, and at least one of the inner catalyst component-containing layer and the outer catalyst component-containing layer further contains a coprecipitated ceria-stabilized zirconia.

Particularly preferably, the exhaust gas-purifying catalyst of the invention is an exhaust gas-purifying catalyst which has a structure to have at least two catalyst component-containing layers on a support having a monolithic structure, and wherein, as the catalyst components, the inner catalyst component-containing layer contains at least one element of the platinum group, activated alumina and cerium oxide, and the outer catalyst component-containing layer contains at least one element of the platinum group, activated alumina, a coprecipitated ceria-stabilized zirconia and optionally a zirconium compound.

As the support having a monolithic structure there can be used a support composed of a heat resistant metal oxide or a heat resistant metal. Its shape can be a honeycomb shape or a foamed product having a three dimensional network structure.

Examples of the heat resistant metal oxides include cordierite, mullite, α-alumina, sillimanite, magnesium silicate, zircon, pentarite, spodumene, aluminosilicates, etc. Further, examples of the heat resistant metals include heat resistant iron-base alloys, heat resistant nickel-base alloys, heat resistant chromium-base alloys, etc.

Most preferably used among these supports having a monolithic structure are honeycomb supports composed of cordierite.

It is desirable to use platinum as the element of the platinum group contained in the inner catalytic component-containing layer. The weight of platinum is not limited so long as the catalytic activity needed can be obtained, but usually 0.1 to 10 g, preferably 0.1 to 3 g per liter of the catalyst.

The activated alumina to be contained in the inner layer is, for example, preferably γ-alumina, its specific surface area is desirably 10 to 300 $m^2/g$, and its weight is usually 30 to 200 g, preferably 40 to 120 g per liter of the catalyst.

Cerium oxide to be contained in the inner layer has a specific surface area of 10 to 300 $m^2/g$ and its weight is usually 10 to 150 g, preferably 10 to 50 g per liter of the catalyst.

Rhodium is desirable as the element of the platinum group to be contained in the outer catalyst component-containing layer. The weight of rhodium is not limited so long as necessary catalytic activity can be obtained, but usually 0.02 to 2 g, preferably 0.02 to 0.7 g per liter of the catalyst.

The active alumina to be contained in the outer layer is identical to one described above, and the weight is usually 5 to 55 g, preferably 10 to 50 g per liter of the catalyst.

The coprecipitated ceria-stabilized zirconia (i.e., cerium oxide-stabilized zirconium oxide prepared by the coprecipitation method) to be contained in the outer and/or inner layers is prepared by the coprecipitation method.

The coprecipitated ceria-stabilized zirconia has a specific surface area of 10 to 150 $m^2/g$, preferably 50 to 80 $m^2/g$ and the weight is usually 1 to 100 g, preferably 5 to 30 g per liter of the catalyst.

The weight ratio of cerium oxide to zirconium oxide composing the coprecipitated ceria-stabilized zirconia is 1/99 to 25/75, preferably 5/95 to 15/85.

[B] A process for preparation of the catalyst of the invention having at least two catalyst component-containing layers Preparation of a coprecipitated ceria-stabilized zirconia A water soluble zirconium salt, e.g. zirconyl nitrate and a water soluble cerium salt, e.g. cerium nitrate are simultaneously or separately dissolved. The water soluble zirconium salt and the water soluble cerium salt can be used in a predetermined amount ratio depending on the desired weight ratio of cerium oxide to zirconium oxide in the coprecipitated ceria-stabilized zirconia to be obtained. To the thus formed aqueous solution of the water soluble zirconium salt and the water soluble cerium salt there can be added an 1 to 10 % by weight, preferably 2 to 7 % by weight aqueous alkali solution, preferably aqueous ammonia solution at a temperature of 0° to 80° C., preferably 10° to 40° C., if necessary under increased pressure or reduced pressure, with sufficient stirring of the aqueous solution and preferably gradually to adjust the pH of the aqueous solution to 6 to 10, preferably 7 to 9, whereby a precipitate can be formed.

It is preferred that, after formation of the precipitate, the suspension is further stirred for 10 minutes to 10 hours, preferably 20 minutes to 3 hours and then left to stand for 1 to 100 hours, preferably 5 to 20 hours to age the precipitate.

This precipitate can be subjected, after suction filtration, to washing with deionized water and suction filtration repeated 2 to 10 times, preferably 3 to 5 times to give the cake of the precipitate.

This cake can be dried at a temperature of 50° to 200° C., preferably 70 to 150° C. and then calcined at a temperature of 600° to 900° C., preferably 700° to 850° C. for 30 minutes to 10 hours, preferably 1 to 5 hours to give a coprecipitated ceria-stabilized zirconia.

Preparation of platinum group element-containing activated alumina to be used in the inner layer Activated alumina (e.g. γ-alumina) is placed in a mixer. It is desirable that the grain size of this activated alumina is 1 to 100 microns (μ), preferably 1 to 50 μ, more preferably 1 to 30 μ. It is also possible to admix in the activated alumina part of cerium oxide and/or the cerium stabililzed zirconium coprecipitation oxide.

To this activated alumina is added, for example, preferably a platinum compound (e.g., hexahydroxoplatinic acid, chloroplatinic acid). The platinum compound can be added portionwise or at a time to γ-alumina with stirring. The platinum compound can be added as a solution (e.g., an aqueous solution) or a suspension (e.g., an aqueous suspension). The weight of the platinum compound to be added may be 1 to 100 g in terms of platinum per kg of the acitivated alumina and 100 to 500 ml as a solution of the platinum compound.

Then, an acetic acid solution, preferably an aqueous 10 to 40 % by weight acetic acid solution is added to the mixture containing the platinum compound and activated alumina. It is preferred that the acetic acid solution is added portionwise to the mixture while it is stirred with a mixer. The amount of acetic acid to be added can be 100 to 300 ml per kg of the activated alumina.

Preparation of a slurry for the inner layer (slurry 1)

The thus obtained platinum-containing activated alumina, cerium oxide, the coprecipitated ceria-stabilized zirconia when used, acetic acid and deionized water are charged into a mill and ground to form a slurry.

The weight of cerium oxide is 50 to 500 g, preferably 150 to 400 g per kg of activated alumina.

The coprecipitated ceria-stabilized zirconia is prepared by the coprecipitation method, and the composition is such that the weight ratio of cerium oxide/zirconium oxide is in the range of 1/99 to 25/75, preferably 5/95 to 15/85. The coprecipitated ceria-stabilized zirconia has a specific surface area of 0 to 150 $m^2/g$, preferably 50 to 80 $m^2/g$, and the weight of the coprecipitated ceria-stabilized zirconia when added is 5 to 1,500 g, preferably 40 to 750 g per kg of activated alumina.

The amount of acetic acid, preferably as an aqueous 60 to 90 % by weight solution can be 50 to 300 ml per kg of activated alumina and the amount of deionized water can be 50 to 3,000 ml per kg of active alumina.

It is possible by the grinding by the mill to make the slurry with the average particle size of 0.1 to 10 $\mu$, preferably 1 to 5 $\mu$.

The formed slurry is discharged to a vessel and deionized water is added to give slurry 1 having a predetermined specific gravity. The specific gravity can, for example, be 1.20 to 1.75 g/ml.

Coating of slurry 1 on support having a monolithic structure

The above slurry is made to coat on a support having a monolithic structure. Such a support was described above.

The slurry is made to coat on the support, for example for 1 to 60 seconds, preferably 3 to 10 seconds, and then the excessive slurry in the cell is removed by air blowing. The support on which the slurry was coated is then exposed, for example to hot air, preferably hot air of 20° to 100° C. to remove at least 50 % of moisture, preferably 90 % of moisture. After removal of the moisture in the above manner, the support can be calcined at a temperature of 200° to 900° C., preferably 300° to 800° C. for 10 minutes to 10 hours, preferably 15 to 60 minutes, for example in the air. When the calcination is carried out by gradually raising the temperature of the support, the above drying (removal of moisture) can be omitted.

By the above coating step of slurry 1 it is possible to make, for example, 30 to 200 g of the platinum-containing alumina, 10 to 150 g of cerium oxide, and 1 to 100 g of the coprecipitated ceria-stabilized zirconia when used coat per liter of the support having a monolithic structure.

Preparation of platinum group element-containing activated alumina to be used in the outer layer Activated alumina is charged in a mixer. This activated alumina is identical to one described above. It is possible to admix in activated alumina part of the coprecipitated ceria-stabilized zirconia.

Then, for example, preferably a rhodium compound (e.g., rhodium nitrate, rhodium chloride) can be added to the mixture containing activated alumina and the platinum compound either portionwise or at a time. The rhodium compound can be added as a solution or suspension. The weight of the rhodium compound can be 0.2 to 50 g in terms of rhodium per kg of activated alumina and 100 to 500 ml as the solution of the rhodium compound.

Then, an acetic acid solution is added. The amount and addition method of acetic acid may be the same as described above.

Preparation of a slurry for the outer layer (slurry 2)

The activated alumina containing rhodium obtained by the above method, the coprecipitated ceria-stabilized zirconia when used, acetic acid and deionized water and optionally a zirconium compound are charged into a mill and ground to form a slurry.

Preferred as the zirconium compounds are zirconyl acetate, zirconyl nitrate, zirconium oxide and zirconyl hydroxide. The weight of the zirconium compound is 1 to 900 g, preferably 150 to 450 g in terms of zirconium oxide per kg of activated alumina.

The coprecipitated ceria-stabilized zirconia is prepared by the coprecipitaion method and its composition is such that the weight ratio of cerium oxide/zirconium oxide is in the range of 1/99 to 25/75, preferably 9/95 to 15/85. The coprecipitated ceria-stabilized zirconia has a specific surface area of 10 to 150 $m^2/g$, preferably 50 to 80 $m^2/g$ and the weight of the ceria-stabilized zirconium coprecipitated oxide is 10 to 2,300 g, preferably 200 to 1,400 g per kg of activated alumina.

Acetic acid and its weight are the same as described above.

It is possible by the grinding with the mill to make the slurry with the average particle size of 0.1 to 10 $\mu$, preferably 1 to 5 $\mu$.

The formed slurry is discharged to a vessel and deionized water is added to give slurry 2 having a predetermined specific gravity. This specific gravity can for example be 1.05 to 1.40 g/ml.

Coating of slurry 2 to the support on which slurry was made to coat

By making the slurry 2 coat on the support to which the slurry 1 coated, by repeating the above-described adhesion step, it is possible to make, for example, 5 to 100 g of rhodium-containing alumina, 1 to 100 g of the coprecipitated ceria-stabilized zirconia when used, and optionally 0.1 to 30 g of the zirconium comopund in terms of zirconium oxide coat per liter of the support.

BEST MODE FOR CARRYING OUT THE INVENTION

Before examples of the invention are described below, there are described as Referene examples 1 and 2
(1) A process for preparation of a ceria-stabilized zirconium coprecipitated oxide to be used in the catalytic component-containig layer(s) in the invention, and
(2) A process for preparation of a impregnated ceria-stabilized zirconia for compasrison, respectively.

REFERENCE EXAMPLE 1

The coprecipitated ceria-stabilized zirconia (cerium oxide-stabilized zirconium oxides prepared by the coprecipitation method) to be used in the later-described examples were prepared accordingly to the following process.

900 g of zirconium nitrate in terms of zirconium oxide and 100 g of cerium nitrate in terms of cerium oxide were dissolved in 15 l of deionized water, and the resulting solution was sufficiently stirred and mixed. To this aqueous solution was added dropwise gradually 5 l of 3 % by weight aqueous ammonia at room temperature with sufficient stirring. Further, for control of pH between 7 and 8, dropwise addition of aqueous ammonia of the same concentration was continued to form a precipitate.

After formation of the precipitate, the mixture was further stirred for 1 hour and left as it was overnight for aging of the precipitate. This precipitate was suction filtered and washed with 20 l of deionized water, and then this procedure was repeated to obtain a cake. This cake was dried at 110° C. and calcined at 800° C. for 3 hours to obtain a ceria-stabilized zirconium coprecipitated oxide wherein the weight ratio of cerium oxide/zirconium oxide was 10/90.

In the same way were prepared coprecipitated ceria-stabilized zirconia wherein the weight ratios of cerium oxide/zirconium oxide were 5/95, 15/85, 20/80 and 25/75.

REFERENCE EXAMPLE 2 (COMPARATIVE EXAMPLE)

A impregnated ceria-stabilized zirconia (cerium oxide-stabilized zirconium oxide prepared by the impregnation method) to be used in the later comparative examples was prepared according to the following method.

To 900 g of commercially available activated zirconium oxide were added 100 g of cerium nitrate in terms of cerium oxide and 2 l of deionized water, and the mixture was sufficiently stirred and mixed. For aging, the mixture was allowed to stand at 60° C. overnight in a dryer, and then dried at 110° C.

The resultant product was ground and calcined at 800° C. for 3 hours to give a impregnated ceria-stabilized zirconia wherein the weight ratio of cerium oxide/zirconium oxide was 10/90.

The invention is more detailedly described below by examples.

EXAMPLE 1

(a) 1.0 kg of activated alumina having a BET surface area of 150 m$^2$/g and an average particle size of 30 was charged in a mixer, and 300 ml of an aqueous amine solution of hydroxylated platinic acid containing 14.8 g of platinum was gradually dropwise added to the activated alumina with stirring to uniformly disperse the former. Then, 100 ml of 25 % by weight acetic acid was gradually dropwise added to be uniformly dispersed, whereby alumina powder containing platinum was prepared.

(b) 727 g by dry weight of the platinum-containing alumina obtained by the step of (a), 273 g of cerium oxide having an average particle size of 15 μ, 71 ml of 90 % by weight acetic acid and 550 ml of deionized water were charged into a mill, and mixed and ground to give an alumina slurry. The grinding was carried out until 90 % or more of particle sizes in the slurry became 9.0 μ or less.

(c) deionized water was added to the slurry obtained in the step of (b) to adjust the specific gravity to 60 g/ml, whereby a diluted slurry was obtained, A cylindrical cordierite-made monolithic carrier having a diameter of 93 mm and a length of 147.5 mmL ( volume 1.0 liter, 400 cells/in$^2$) was dipped in the diluted slurry for 5 seconds, and, after drawing up the carrier from the diluted slurry, the excessive slurry was removed by air blowing. The carrier was then dried at 30 to 60° C. and calcined at 500° C. for 30 minutes. A support having a catalyst component-containing layer for the inner layer containing platinum, activated alumina and cerium oxide was obtained by the successive steps (a), (b) and (c).

(d) 1.0 kg of activated alumina having a BET surface area of 150 m$^2$/g and an average particle size of 30 μ was charged in a mixer, and while the alumina was stirred, 250 ml of an aqueous rhodium nitrate solution containing 10.6 g of rhodium was gradually dropwise added to be uniformly dispersed.

Finally, 100 ml of 25 % by weight acetic acid was gradually dropwise added to be uniformly dispersed to prepare alumina powder containing rhodium.

(e) 594 g by dry weight of the rhodium-containing alumina obtained by the step of (d), 136 g of zirconyl acetate in terms of zirconium oxide, 270 g of the coprecipitated ceria-stabilized zirconia (the weight ratio of cerium oxide/zirconium oxide : 10/90) preapred in Reference example 1, 71 ml of 90 % by weight acetic acid, and 500 ml of deionized water were charged into a mill, and mixed and ground to obtain an alumina slurry. The grinding was carried out until 90 % or more of the particle sizes in the slurry became 9.0 μ or less.

(f) Deionized water was added to the slurry obtained in the step of (e) to adjust the specific gravity to 1.20 g/ml, whereby a diluted slurry was obtained. In this diluted slurry was dipped for 5 seconds the support obtained in the step of (c) and having a catalyst component-containing layer for the innert layer containing platinum, activated alumina and cerium oxide, and, after drawing up the carrier from the diluted slurry, the excessive slurry was removed by air blowing. The carrier was then dried at 30 to 60° C. and burned at 500° C. for 30 minutes.

The catalyst DL-1 obtained by the successive steps of (a) to (f) has two catalyst component-containing layers, i.e. inner and outer layers on the support having a monolithic structure, and contained, per liter of the completed catalyst, 1.17 g of platinum, 80 g of alumina and 30 g of cerium oxide in the inner layer, and 0.23 g of rhodium, 22 g of alumina, 5 g of zirconium oxide and 10 g of the coprecipitated ceria-stabilized zirconia (cerium oxide/zirconium oxide weight ratio : 10/90).

EXAMPLE 2

The same procedure as in Example 1 was carried out to obtain a catalyst DL-2 except that the ceria-stabilized zirconium coprecipitated oxide was not added in the step (e) and, instead, 91 g (10 g per liter of the completed catalyst) of the coprecipitated ceria-stabilized zirconia was added in the step of (b) to make the inner catalyst component-containing layer contain the coprecipitated ceria-stabilized zirconia.

EXAMPLE 3

The same procedure as in Example 1 was carried out except that 91 g (10 g per liter of the completed catalyst) of the coprecipitated ceria-stabilized zirconia was added in the step of (b), whereby a catalyst DL-3 was obtained.

COMPARATIVE EXAMPLE 1

A two-layered structure catalyst wherein the coprecipitated ceria-stabilized zirconia is not added The same procedure as in Example 1 was carried out except that the coprecipitated ceria-stabilized zirconia was not added in the step of (e), whereby a catalyst DL-4 was obtained.

EXAMPLE 4

The same procedure as in Example 1 was carried out except that zirconyl acetate was not added in the step of (e), whereby a catalyst DL-5 was obtained.

EXAMPLE 5

The same procedure as in Example 1 was carried out except that in the step of (e) zirconyl acetate was not added and, instead, 270 g (10 g per liter of the completed catalyst) of cerium oxide was added, whereby a catalyst DL-6 was obtained.

COMPARATIVE EXAMPLE 2

A two-layered structure catalyst wherein the coprecipitated ceria-stabilized zirconia is not added The same procedure as in Example 1 was carried out except that in the step of (e) the coprecipitated ceria-stabilized zirconia was not added and, instead, 270 g (10 g per liter of the completed catalyst) of cerium oxide was added, whereby a catalyst DL-7 was obtained.

COMPARATIVE EXAMPLE 3

A two-layered structure catalyst wherein the coprecipitated ceria-stabilized zirconia is not added The same procedure as in Example 1 was carried out except that in the step of (e) the coprecipitated ceria-stabilized zirconia and zirconium acetate were not added and, instead, 270 g (10 g per liter of the completed catalyst) of cerium oxide was added, whereby a catalyst DL-8 was obtained.

EXAMPLE 6

The same procedure as in Example 1 was carried out except that the addition amount of the coprecipitated ceria-stabilized zirconia was changed from 270 g to 27 g, whereby a catalyst DL-9 was obtained which contained 1 g of the coprecipitated ceria-stabilized zirconia per liter of the completed catalyst.

EXAMPLE 7

The same procedure as in Example 1 was carried out except that the addition amount of the ceria-stabilized zirconium coprecipitated oxide was changed from 270 g to 135 g in the step of (e), whereby a catalyst DL-10 was obtained which contained 5 g of the coprecipitated ceria-stabilized zirconia per liter of the completed catalyst.

EXAMPLE 8

The same procedure as in Example 1 was carried out except that the addition amount of the coprecipitated ceria-stabilized zirconia was changed from 270 g to 540 g in the step of (e), whereby a catalyst DL-11 was obtained which contained 20 g of the coprecipitated ceria-stabilized zirconia per liter of the complete catalyst.

EXAMPLE 9

The same procedure as in Example 1 was carried out except that the addition amount of the coprecipitated ceria-stabilized zirconia was changed from 270 g to 810 g in the step of (e), whereby a catalyst DL-12 was obtained which contained 30 g of the coprecipitated ceria-stabilized zirconia per liter of the completed catalyst.

EXAMPLE 10

The same procedure as in Example 1 was carried out except that the addition amount of the coprecipitated ceria-stabilized zirconia was changed from 270 g to 1350 g, whereby a catalyst DL-13 was obtained which contained 50 g of the coprecipitated ceria-stabilized zirconia per liter of the completed catalyst.

COMPARATIVE EXAMPLE 4

A two-layered structure catalyst wherein the coprecipitated ceria-stabilized zirconia is not added The same procedure as in Example 4 was carried out except that in the step of (e) the coprecipitated ceria-stabilized zirconia was not added and, instead, 27 g of cerium nitrate in terms of cerium oxide (1 g of cerium oxide per liter of the completed catalyst) and 243 g of zirconyl acetate in terms of zirconium oxide (9 g of zirconium oxide per liter of the completed catalyst) were added, whereby a catalyst DL-14 was obtained.

COMPARATIVE EXAMPLE 5

A two-layered structure catalyst wherein the coprecipitated ceria-stabilized zirconia is not added The same procedure as in Example 3 was carried out except that in the step of (e) the coprecipitated ceria-stabilized zirconia was not added and, instead, 27 g of cerium nitrate in terms of cerium oxide (1 g of cerium oxide per liter of the copmleted catalyst) and 243 g of zirconium oxide (9 g of zirconium oxide per liter of the completed catalyst) were added, whereby a catalyst DL-15 was obtained.

COMPARATIVE EXAMPLE 6

A two-layered structure catalyst wherein the coprecipitated ceria-stabilized zirconia is not added The same procedure as in Example 4 was carried out except that in the step of (e) the coprecipitated ceria-stabilized zirconia was not added and, instead, 27 g of cerium oxide (1 g of cerium oxide per liter of the copmleted catalyst) and 243 g of zirconyl acetate in terms of zirconium oxide (9 g of zirconium oxide per liter of the completed catalyst) were added, whereby a catalyst DL-16 was obtained.

COMPARATIVE EXAMPLE 7

A two-layered structure catalyst wherein the coprecipitated ceria-stabilized zirconia is not added The same procedure as in Example 3 was carried out except that in the step of (e) the coprecipitated ceria-stabilized zirconia was not added and, instead, 27 g of cerium oxide (1 g of cerium oxide per liter of the copmleted catalyst) and 243 g of zirconium oxide (9 g of zirconium oxide per liter of the completed catalyst) were added, whereby a catalyst DL-17 was obtained.

COMPARATIVE EXAMPLE 8

A two-layered structure catalyst wherein cerium oxide is not added

The same procedure as in Example 1 was carried out except that the cerium oxdie was not added in the step of (e), whereby a catalyst DL-18 was obtained.

EXAMPLE 11

The same procedure as in Example 1 was carried out except that in the step of (e) the coprecipitated ceria-stabilized zirconia having a cerium oxide/zirconium oxide weight ratio of 5/95 was used in place of the coprecipitated ceria-stabilized zirconia having a cerium oxide/zirconium oxide weight ratio of 10/90, whereby a catalyst DL-19 was obtained.

EXAMPLE 12

The same procedure as in Example 1 was carried out except that in the step of (e) the coprecipitated ceria-stabilized zirconia having a cerium oxide/zirconium oxide weight ratio of 15/85 was used in place of the coprecipitated ceria-stabilized zirconia having a cerium oxide/zirconium oxide weight ratio of 10/90, whereby a catalyst DL-20 was obtained.

EXAMPLE 13

The same procedure as in Example 1 was carried out except that in the step of (e) the coprecipitated ceria-stabilized zirconia having a cerium oxide/zirconium oxide weight ratio of 20/80 was used in place of the coprecipitated ceria-stabilized zirconia having a cerium oxide/zirconium oxide weight ratio of 10/90, whereby a catalyst DL-21 was obtained.

EXAMPLE 14

The same procedure as in Example 1 was carried out except that in the step of (e) the coprecipitated ceria-stabilized zirconia having a cerium oxide/zirconium oxide weight ratio of 25/75 was used in place of the coprecipitated ceria-stabilized zirconia having a cerium oxide/zirconium oxide weight ratio of 10/90, whereby a catalyst DL-22 was obtained.

COMPARATIVE EXAMPLE 9

A two-layered structure catalyst wherein the impregnated ceria-stabilized zirconia prepared by the impregnation method in place of the coprecipitation method is added The same procedure as in Example 1 was carried out except that in the step of (e) in place of using the coprecipitated ceria-stabilized zirconia, the ceria-stabilized zirconium impregnated oxide was used which had the same weight ratio and was prepared by the impregnation method as the different preparation method, whereby a catalyst DL-23 was obtained.

TEST EXAMPLE 1

Each of the catalyst obtained in Examples 1 to and Comparative examples 1 to 9 (Sample symbols DL-1 to DL-23) were subjected to the durability test according to the following method and thereby its catalytic performance was evaluated.

DURABILITY TEST CONDITIONS

The durability test was carried out by packing each catalyst in a multi-chamber reactor and flowing the engine exhaust gas through the multi-chamber reactor for hours under the following conditions :

| Driving mode; | Steady state (A/F = 14.6) | 60 seconds |
| | Deceleration (fuel cut, high temperature oxidation atmosphere) | .5 seconds |
| Catalyst inlet temperature; | 850° C. | |
| Fuel; | Gasoline (lead-free) | |

CATALYTIC PERFORMANCE EVALUATION CONDITIONS

Evaluation of catalytic performance was carried out by packing each catalyst into the same multi-chamber reactor as above equipped with a sampling tube and analyzing the gas components at the upstream and downstream of the catalyst using MEXA 8120 produced by Horiba Seisaku Sho Co., Ltd. Used as the exhaust gas was an actual exhaust gas. Evaluation of the performance was carried out under the following conditions:

| Air/fuel ratio; | 14.55, 14.7, 14.85 (A/F = ±0.5) |
| SV; | 133,000/Hr |
| Catalyst inlet temperature; | 400° C. |
| Frequency; | 2.0 Hz |

The purification ratio of each component (CO, HC, NOx) was calculated as the average value of the purification ratio at each of the above A/F.

The results were shown in Tables 1 to 7.

TABLE 1

| Experimental example | Sample Symbol | Structure of catalytic component | Coprecipitated ceria-stabilized zirconia (g/l) | | Purification ratio (%) | | |
| --- | --- | --- | --- | --- | --- | --- | --- |
| | | | Inner layer | Outer layer | CO | HC | NOx |
| Example 1 | DL-1 | 2 layers | No addition | 10 | 91 | 91 | 74 |
| Example 2 | DL-2 | 2 layers | 10 | No addition | 87 | 88 | 72 |
| Example 3 | DL-3 | 2 layers | 10 | 10 | 91 | 91 | 74 |
| Comparative | DL-4 | 2 layers | No addition | No addition | 85 | 87 | 70 |

TABLE 1-continued

| Experimental example | Sample Symbol | Structure of catalytic component | Coprecipitated ceria-stabilized zirconia (g/l) | | Purification ratio (%) | | |
|---|---|---|---|---|---|---|---|
| | | | Inner layer | Outer layer | CO | HC | NOx |
| example 1 | | | | | | | |

*1; In each sample results evaluated after the durability test at 850° C. for 50 hours are presented.
*2; Each sample has a structure of two catalyst component-containing layers, the ratio and amount of the platinum group elements therein are constant and Pt/Rh = 5/1 and 1.4 g/l, and each sample has Pt in the inner layer and Rh in the outer layer. Each sample is a catalyst whose cell number was constant and to be 400 cpi$^2$.
*3; The coprecipitated ceria-stabilized zirconia was one prepared by the coprecipitation method and its composition is 90% by weight of zirconium oxide and 10% by weight of cerium oxide.
*4; Each sample is a catalyst containing as other catalyst components than those described in the table 80 g/l activated alumina and 30 g/l cerium oxide in the inner layer and 22 g/l activated alumina and 5 g/l zirconium oxide in the outer layer.
*5; Purification performance evaluation conditions
Air/fuel ratio; 14.55, 14.70, 14.85 (A/F = ±0.5)
SV; 133,000/Hr
Catalyst inlet temperature; 400° C.
Frequency; 2.0 Hz
Purification ratio (%); Average value of the purification ratio in each of the above air/fuel ratios

TABLE 2

| Experimental example | Sample symbol | Amount of the coprecipitated ceria-stabilized zirconia in the outlet layer (g/l) | Amount of cerium oxide in the outer layer (g/l) | Amount of zirconyl acetate in the outer layer (g/l) (in terms of ZrO$_2$) | Purification ratio (%) | | |
|---|---|---|---|---|---|---|---|
| | | | | | CO | HC | NOx |
| Example 4 | DL-5 | 10 | No addition | No addition | 90 | 91 | 75 |
| Example 5 | DL-6 | 10 | 10 | No addition | 91 | 90 | 74 |
| Example 6 | DL-1 | 10 | No addition | 5 | 91 | 91 | 74 |
| Comparative example 2 | DL-7 | No addition | 10 | 5 | 84 | 87 | 69 |
| Comparative example 3 | DL-8 | No addition | 10 | No addition | 83 | 86 | 69 |
| Comparative example 1 | DL-4 | No addition | No addition | 5 | 85 | 87 | 70 |

*1; In each sample results evaluated after the durability test at 850° C. for 50 hours are presented.
*2; Each sample has a structure of two catalyst component-containing layers, the ratio and amount of the platinum group elements therein are constant and Pt/Rh = 5/1 and 1.4 g/l, and each sample has Pt in the inner layer and Rh in the outer layer. Each sample is a catalyst whose cell number was constant and to be 400 cpi$^2$.
*3; The coprecipitated ceria-stabilized zirconia was one prepared by the coprecipitation method and its composition is 90% by weight of zirconium oxide and 10% by weight of cerium oxide.
*4; Each sample is a catalyst containing 80 g/l activated alumina and 30 g/l cerium oxide in the inner layer and as other catalyst components other than those described in the table 22 g/l activated alumina in the outer layer.
*5; Purification performance evaluation conditions
Air/fuel ratio; 14.55, 14.70, 14.85 (A/F = ±0.5)
SV; 133,000/Hr
Catalyst inlet temperature; 400° C.
Frequency; 2.0 Hz
Purification ratio (%); Average value of the purification ratio in each of the above air/fuel ratios

TABLE 3

| Experimental example | Sample Symbol | Amount of the coprecipitated ceria-stabilized zirconia in the outer layer (g/l) | Purification ratio (%) | | |
|---|---|---|---|---|---|
| | | | CO | HC | NOx |
| Comparative Example 1 | DL-4 | 0 | 85 | 87 | 70 |
| Example 6 | DL-9 | 1 | 87 | 90 | 72 |
| Example 7 | DL-10 | 5 | 90 | 91 | 73 |
| Example 1 | DL-1 | 10 | 91 | 91 | 74 |
| Example 8 | DL-11 | 20 | 95 | 92 | 76 |
| Example 9 | DL-12 | 30 | 95 | 91 | 77 |
| Example 10 | DL-13 | 50 | 93 | 89 | 75 |

*1; In each sample results evaluated after the durability test at 850° C. for 50 hours are presented.
*2; Each sample has a structure of two catalyst component-containing layers, the ratio and amount of the platinum group elements therein are constant and Pt/Rh = 5/1 and 1.4 g/l, and each sample has Pt in the inner layer and Rh in the outer layer. Each sample is a catalyst whose cell number was constant and to be 400 cpi$^2$.
*3; Each sample contains the coprecipitated ceria-stabilized zirconia in the outer layer.
*4; Each sample is a catalyst containing 80 g/l activated alumina and 30 g/l cerium oxide in the inner layer and as other catalyst components than those described in the outer layer.
*5; Each sample is a catalyst containing 80 g/l activated alumina and 30 g/l cerium oxide in the inner layer and as other catalyst components than those described in the table 22 g/l activated alumina and 5 g/l zirconium oxide in the outer layer.
*6; Purification performance evaluation conditions
Air/fuel ratio; 14.55, 14.70, 14.85 (A/F = ±0.5)
SV; 133,000/Hr
Catalyst inlet temperature; 400° C.
Frequency; 2.0 Hz
Purification ratio (%); Average value of the purification ratio in each of the above air/fuel ratios

TABLE 4

| Experimental example | Sample Symbol | Amount of the coprecipitated ceria-stabilized zirconia in the outer layer (g/l) | Cerium compound added in the outer layer (in terms of $CeO_2$; 1 g/l) | Zirconium compound added in the outer layer (in terms of $ZrO_2$; 9 g/l) | Purification ratio (%) | | |
|---|---|---|---|---|---|---|---|
| | | | | | CO | HC | NOx |
| Example 4 | DL-5 | 10 | No addition | No addition | 91 | 91 | 74 |
| Comparative example 4 | DL-14 | No addition | Cerium nitrate | Zirconyl acetate | 82 | 89 | 68 |
| Comparative example 5 | DL-15 | No addition | Cerium nitrate | Zirconium oxide | 84 | 89 | 68 |
| Comparative example 6 | DL-16 | No addition | Cerium oxide | Zirconyl acetate | 85 | 89 | 70 |
| Comparative example 7 | DL-17 | No addition | Cerium oxide | Zirconium oxide | 84 | 90 | 70 |

*1; In each sample results evaluated after the durability test at 850° C. for 50 hours are presented.
*2; Each sample has a structure of two catalyst component-containing layers, the ratio and amount of the platinum group elements therein are constant and Pt/Rh = 5/1 and 1.4 g/l, and each sample has Pt in the inner layer and Rh in the outer layer. Each sample is a catalyst whose cell number was constant and to be 400 cpi$^2$.
*3; The catalyst components described in the table were those added to the outer layer of the two-layered structure.
*4; Each sample is a catalyst containing 80 g/l activated alumina and 30 g/l cerium oxide in the inner layer and as other catalyst components other than those described in the table 22 g/l activated alumina in the outer layer.
*5; The coprecipitated ceria-stabilized zirconia was one prepared by the coprecipitation method and its compoisition is 90% by weight of zirconium oxide and 10% by weight of cerium oxide.
*6; Purification performance evaluation conditions
Air/fuel ratio; 14.55, 14.70, 14.85 (A/F = ±0.5)
SV; 133,000/Hr
Catalyst inlet temperature; 400° C.
Frequency; 2.0 Hz
Purification ratio (%); Average value of the purification ratio in each of the above air/fuel ratios

TABLE 5

| Experimental example | Sample Symbol | Amount of the coprecipitated ceria-stabilized zirconia in the outer layer (g/l) | Amount of cerium oxide in the outer layer (g/l) | Amount of cerium oxide in the inner layer (g/l) | Purification ratio (%) | | |
|---|---|---|---|---|---|---|---|
| | | | | | CO | HC | NOx |
| Example 1 | DL-1 | 10 | No addition | 30 | 91 | 91 | 74 |
| Comparative Example 8 | DL-18 | 10 | No addition | No addition | 85 | 89 | 69 |

*1; In each sample results evaluated after the durability test at 850° C. for 50 hours are presented.
*2; Each sample has a structure of two catalyst component-containing layers, the ratio and amount of the platinum group elements therein are constant and Pt/Rh = 5/1 and 1.4 g/l, and each sample has Pt in the inner layer and Rh in the outer layer. Each sample is a catalyst whose cell number was constant and to be 400 cpi$^2$.
*3; The coprecipitated ceria-stabilized zirconia was one prepared by the coprecipitation method and its composition is 90% by weight of zirconium oxide and 10% by weight of cerium oxide.
*4; Each sample having a two-layer structure is a catalyst containing, as other catalyst components than those described in the table, 80% of activated alumina in the inner layer and 22 g/l activated alumina and 5 g/l zirconium oxide in the outer layer.
*5; Purification performance evaluation conditions
Air/fuel ratio; 14.55, 14.70, 14.85 (A/F = ±0.5)
SV; 133,000/Hr
Catalyst inlet temperature; 400° C.
Frequency; 2.0 Hz
Purification ratio (%); Average value of the purification ratio in each of the above air/fuel ratios

TABLE 6

| Experimental example | Sample symbol | Amount of the coprecipitated ceria-stabilized zirconia in the outer layer (g/l) | The weight ratio of cerium oxide/zirconium oxide in the coprecipitated ceria-stabilized zirconia in the outer layer | Purification ratio (%) | | |
|---|---|---|---|---|---|---|
| | | | | CO | HC | NOx |
| Example 11 | DL-19 | 10 | 5/95 | 89 | 91 | 73 |
| Example 1 | DL-1 | 10 | 10/90 | 91 | 91 | 74 |
| Example 12 | DL-20 | 10 | 15/85 | 90 | 91 | 73 |
| Example 13 | DL-21 | 10 | 20/80 | 87 | 89 | 72 |

TABLE 6-continued

| Experimental example | Sample symbol | Amount of the coprecipitated ceria-stabilized zirconia in the outer layer (g/l) | The weight ratio of cerium oxide/zirconium oxide in the coprecipitated ceria-stabilized zirconia in the outer layer | Purification ratio (%) | | |
|---|---|---|---|---|---|---|
| | | | | CO | HC | NOx |
| Example 14 | DL-22 | 10 | 25/75 | 88 | 87 | 71 |

*1; In each sample results evaluated after the durability test at 850° C. for 50 hours are presented.
*2; Each sample has a structure of two catalyst component-containing layers, the ratio and amount of the platinum group elements therein are constant and Pt/Rh = 5/1 and 1.4 g/l, and each sample has Pt in the inner layer and Rh in the outer layer. Each sample is a catalyst whose cell number was constant and to be 400 cpi².
*3; Each sample contains the coprecipitated ceria-stablized zirconia in the outer layer.
*4; The cerium-stabilized zirconium coprecipitation oxide is one prepared by the coprecipitation method.
*5; Each sample is a catalyst containing in the inner layer 80 g/l activated alumina and 30 g/l cerium oxide and in the outer layer, as other catalyst components than those described in the table, 22 g/l activated alumina.
*6; Purification performance evaluation conditions
Air/fuel ratio; 14.55, 14.70, 14.85 (A/F = ±0.5)
SV; 133,000/Hr
Catalyst inlet temperature; 400° C.
Frequency; 2.0 Hz
Purification ratio (%); Average value of the purification ratio in each of the above air/fuel ratios

TABLE 7

| Experimental example | Sample symbol | Amount of the ceria-stabilized zirconia in the outer layer (g/l) | Preparation method of the ceria-stabilized zirconia in the outer layer A Coprecipitation method B Impregnation method | Purification ratio (%) | | |
|---|---|---|---|---|---|---|
| | | | | CO | HC | NOx |
| Example 1 | DL-1 | 10 | A | 91 | 91 | 74 |
| Comparative example 9 | DL-23 | 10 | B | 86 | 88 | 70 |
| Comparative example 1 | DL-4 | 0 | — | 85 | 87 | 70 |

*1; In each sample results evaluated after the durability test at 850° C. for 50 hours are presented.
*2; Each sample has a structure of two catalyst component-containing layers, the ratio and amount of the platinum group elements therein are constant and Pt/Rh = 5/1 and 1.4 g/l, and each sample has Pt in the inner layer and Rh in the outer layer. Each sample is a catalyst whose cell number was constant and to be 400 cpi².
*3; The catalyst components described in the table are those added to the outer layer of the two-layered structure.
*4; Each sample is a catalyst containing in the inner layer 80 g/l activated alumina and 30 g/l cerium oxide and in the outer layer, as other catalyst components than those described in the table, 22 g/l activated alumina.
*5; The compoisition of the ceria-stabilized zirconia is 90% by weight of zirconium oxide and 10% by weight of cerium oxide.
*6; Purification performance evaluation conditions
Air/fuel ratio: 14.55, 14.70, 14.85 (A/F = ±0.5)
SV; 133,000/Hr
Catalyst inlet temperature; 400° C.
Frequency; 2.0 Hz
Purification ratio (%); Average value of the purification ratio in each of the above air/fuel ratios Table 1 shows, in each catalyst after high temperature aging at 850° C., the effect of addition of the coprecipitated ceria-stabilized zirconia to the outer and/or inner layers of the catalyst having two or more catalytic component-containing layers on the purification performance.

As is seen from Table 1, the catalysts (Sample symbols ; DL-1, DL-2 and DL-3) wherein the coprecipitated ceria-stabilzed zirconia preserving the metastable tetragonal system structure even after high temperature aging was added to the outer and/or inner layers of the catalysts having a structure of two or more catalyst component-containing layers exhibited an excellent purification performance after high temperature aging, compared to the usual catalyst (Sample symbol ; DL-4) wherein the coprecipitated ceria-stabilized zirconia was not added to the outer layer nor to the inner layer.

Table 2 shows, in each catalyst after high temperature aging at 850° C., the effect of the component added to the outer layer of the catalyst having a structure of two or more catalytic component layers on its purification performance.

As is seen from Table 2, the coprecipitated ceria-stabilized zirconia was most effective as a catalyst component to be added to the outer layer of the catalyst having a structure of two or more catalyst component layers.

Table 3 shows, in each catalyst after high temperature aging at 850° C., the effect, of the addition amount of the coprecipitated ceria-stabilized zirconia to be added to the outer layer of the catalyst having a structure of two or more catalytic component layers on its purification performance.

As is seen from Table 3, although the effect of the coprecipitated ceria-stabilized zirconia is observed even in a small amount, the optimum range of the amount is 1 to 50 g/l, preferably 5 to 30 g/l.

Table 4 shows, in each catalyst after high temperature aging at 850° C., the effect on its purification performance of the case where the coprecipitated ceria-stabilized zirconia was used forming previously a composite oxide by the coprecipitation method or the case where a method was used wherein the cerium compound and the zirconium compound were used at the same time and a composite oxide was formed during preparation of the catalyst or during use of the catalyst.

As is seen from Table 4, the addition of the coprecipitated ceria-stabilized zirconia which is a composite oxide previously formed by the coprecipitation method and preserving the metastable tetragonal system structure was effective, whereas the effect was not observed in case of the method, as disclosed in Japanese Laid-Open Patent Publication No. 116,741/1988, to form a composite oxide during preparation or use of the catalyst.

Table 5 shows, in each catalyst after high temperature aging at 850° C., the synergistic effect on its purification performance of the coprecipitated ceria-stabilized zirconia and cerium oxide.

As is seen from Table 5, the oxygen storage ability of both the ceria-stabilized zirconia and cerium oxide was indispensable for enhancement of purification performance.

Table 6 shows, in each catalyst after high temperature aging at 850° C., the effect of the weight ratio of cerium oxide to zirconium oxide in the coprecipitated ceria-stabilized zirconia on its purification performance.

As is seen from Table 6, the weight ratio of cerium oxide to zirconium oxide in the coprecipitated ceria-stbilized zirconia was preferably 1/99 to 25/75, more preferably 5/95 to 15/85.

Table 7 shows, in each catalyst after high temperature aging at 850° C., the effect of the preparation method of the cerium-stabilized zirconium oxide on its purification performance.

As is seen from Table 7, the catalyst containing the ceria-stabilized zirconia prepared by the coprecipitation method was effective for remarkable enhancement of purification performance, whereas the catalyst (Sample symbol DL-23) containing the cerium-stabilized zirconium oxide prepared by the impregnation method scarcely exhibited the improved effect of purification performance compared to the catalyst (Sample symbol DL-4) which does not contain the cerium-stabilized zirconium oxide.

INDUSTRIAL APPLICABILITY

As is described above, in this invention, purification performance at low temperature after high temperature aging was enhanced by combination of a catalyst containing at least one usual element of the platinum group, activated alumina, cerium oxide and optionally a zirconium compound with a coprecipitated ceria-stabilized zirconia having heat resistance and specific oxygen storage performance. Further, it was found that it is more effective, for enhancement of purification performance at low temperature after high temperature aging, to add this coprecipitated ceria-stabilized zirconia to the outer layer of a catalyst having a structure of at least two catalyst component layers.

By this invention, it became possible to provide a catalyst, when evaluated by purification ratio at low temperature (400° C.) after high temperature aging at 850° C., enhancing the purification ratio of all the regulated substances by 3 to 10%, compared to usual catalysts.

We claim:

1. An exhaust gas-purifying catalyst which has a structure to have at least two catalyst component-containing layers on a support having a monolithic structure, and wherein, as the catalyst components, the inner catalyst component-containing layer contains at least one element of the platinum group, activated alumina and cerium oxide, the outer catalyst component-containing layer contains at least one element of the platinum group and activated alumina, and at least one of the inner catalyst component-containing layer and the outer catalyst component-containing layer further contains a coprecipitated ceria-stabilized zirconia.

2. An exhaust gas-purifying catalyst which has a structure to have at least two catalyst component-containing layers on a support having monolithic structure, and wherein, as the catalyst components, the inner catalyst component-containing layer contains at least one element of the platinum group, activated alumina and cerium oxide, and the outer catalyst component-containing layer contains at least one element of the platinum group, activated alumina and a coprecipitated ceria-stabilized zirconia.

3. The exhaust gas-purifying catalyst of claim 1 wherein the inner catalyst component-containing layer contains the coprecipitated ceria-stabilized zirconia.

4. The exhaust gas-purifying catalyst of claim 1 wherein both the inner catalyst component-containing layer and the outer catalyst component-containg layer contain the, coprecipitated ceria-stabilized zirconia.

5. The exhaust gas-purifying catalyst of any one of claims 1 to 4 wherein the inner catalyst component-containing layer contains platinum as the at least one element of the platinum group and the outer catalyst component-containing layer contains rhodium as the at least one element of the platinum group.

6. The exhaust gas-purifying catalyst of claim 5 wherein the coprecipitated ceria-stabilized zirconia contains 1 to 25 % by weight of cerium oxide and 99 to 75 by weight of zirconium oxide.

7. The exhaust gas-purifying catalyst of claim 5 wherein the coprecipitated ceria-stabilized zirconia contains 5 to 15 % by weight of cerium oxide and 95 to 85 by weight of zirconium oxide.

8. A process for preparation of the exhaust gas-purifying catalyst of claim 1 which comprises
    (a) a step to prepare activated alumina containing at least one element of the platinum group,
    (b) a step to prepare a slurry 1 containing the prepared platinum group element-containing activated alumina and at least cerium oxide,
    (c) a step to make the slurry 1 coat onto the support having a monolithic structure and calcine it to form the inner catalyst component-containing layer,
    (d) a step to prepare activated alumina containing at least one element of the platinum group,
    (e) a step to preapre a slurry 2 containing the prepared platinum group element-containing activated alumina, and
    (f) a step to make the slurry 2 prepared in the step of (e) coat onto the catalyst prepared in the step of (c) and calcine it to form the outer catalyst component-containing layer,
provided that at least one of the above slurries 1 and 2 contains the coprecipitated ceria-stabilized zirconia.

9. The process for preparation of the exhaust gas-purifying catalyst of claim 8 wherein the slurry 1 does not contain the coprecipitated ceria-stabilized zirconia and the slurry 2 contains the coprecipitated ceria-stabilized zirconia.

10. The process for preparation of the exhaust gas-purifying catalyst of claim 8 wherein the slurry 1 contains the coprecipitated ceria-stabilized zirconia and the slurry 2 does not contain the coprecipitated ceria-stabilized zirconia.

11. The process for preparation of the exhaust gas-purifying catalyst of claim 8 wherein both the slurries 1 and 2 contain the coprecipitated ceria-stabilized zirconia.

12. The exhaust gas-purifying catalyst of any one of claims 8 to 11 wherein the slurry 1 contains platinum and the slurry 2 contains rhodium.

13. The process for preparation of the exhaust gas-purifying catalyst of claim 12 wherein the coprecipitated ceria-stabilized zirconia contains 1 to 25 by weight of cerium oxide and 99 to 75 % by weight of zirconium oxide.

14. The process for preparation of the exhaust gas-purifying catalyst of claim 12 wherein the coprecipitated ceria-stabilized zirconia contains 5 to 15 by weight of cerium oxide and 95 to 85 % by weight of zirconium oxide.

15. An exhaust gas-purifying catalyst which has a structure to have at least two catalyst component-containing layers on a support having a monolithic structure, and wherein, as the catalyst components, the inner catalyst component-containing layer contains at least one element of the platinum group, activated alumina and cerium oxide, the outer catalyst component-containing layer contains at least one element of the platinum group, activated alumina and a zirconium compound, and at least one of the inner catalyst component-containing layer and the outer catalyst component-containing layer further contains a coprecipitated ceria-stabilized zirconia.

16. An exhaust gas-purifying catalyst which has at least two catalyst component-containing layers on a support having a monolithic structure, and wherein, as the catalytic components, the inner catalyst component-containing layer contains at least one element of the platinum group, activated alumina and cerium oxide and the outer catalyst component-containing layer contains at least one element of the platinum group, activated alumina, coprecipitated ceria-stabilized zirconia and a zirconium compound.

17. The exhaust gas-purifying catalyst of claim 15 wherein the inner catalyst component-containing layer contains the coprecipitated ceria-stabilized zirconia.

18. The exhaust gas-purifying catalyst of claim 15 wherein both the inner catalyst component-containing layer and the outer catalyst component-containing layer contain the coprecipitated ceria-stabilized zirconia.

19. The exhaust gas-purifying catalyst of any one of claims 15 to 18 wherein the inner catalyst component-containing layer contains platinum as the at least one element of the platinum group and the outer catalyst component-containing layer contains rhodium as the at least one element of the platinum group.

20. The exhaust gas-purifying catalyst of claim 19 wherein the coprecipitated ceria-stabilized zirconia contains 1 to 25 % by weight of cerium oxide and 99 to 75 by weight of zirconium oxide.

21. The exhaust gas-purifying catalyst of claim 19 wherein the coprecipitated ceria-stabilized zirconia contains 5 to 15 % by weight of cerium oxide and 95 to 85 by weight of zirconium oxide.

22. A process for preparation of the exhaust gas-purifying catalyst of claim 15 which comprises
(a) a step to prepare activated alumina containing at least one element of the platinum group,
(b) a step to prepare a slurry 1 containing the prepared platinum group element-containing activated alumina and at least cerium oxide,
(c) a step to make the slurry 1 coat onto the support having a monolithic structure and calcine it to form the inner catalyst component-containing layer,
(d) a step to prepare activated alumina containing at least one element of the platinum group,
(e) a step to prepare a slurry 2 containing the prepared platinum group element-containing activated alumina and a zirconium compound, and
(f) a step to make the slurry 2 prepared in the step of (e) coat onto the catalyst prepared in the step of (c) and calcine it to form the outer catalyst component-containing layer, provided that at least one of the slurries 1 and 2 contains the coprecipitated ceria-stabilized zirconia.

23. The process for preparation of the exhaust gas-purifying catalyst of claim 22 wherein the slurry 1 does not contain the coprecipitated ceria-stabilized zirconia and the slurry 2 contains the coprecipitated ceria-stabilized zirconia.

24. The process for preparation of the exhaust gas-purifying catalyst of claim 22 wherein the slurry 1 contains the coprecipitated ceria-stabilized zirconia and the slurry 2 does not contain the coprecipitated ceria-stabilized zirconia.

25. The process for preparation of the exhaust gas-purifying catalyst of claim 22 wherein both the slurries 1 and 2 contain the coprecipitated ceria-stabilized zirconia.

26. The exhaust gas-purifying catalyst of any one of claims 22 to 25 wherein the slurry 1 contains platinum and the slurry 2 contains rhodium.

27. The process for preparation of the exhaust gas-purifying catalyst of claim 26 wherein the coprecipitated ceria-stabilized zirconia contains 1 to 25 % by weight of cerium oxide and 99 to 75 % by weight of zirconium oxide.

28. The process for preparation of the exhaust gas-purifying catalyst of claim 26 wherein the coprecipitated ceria-stabilized zirconia contains 5 to 15 by weight of cerium oxide and 95 to 85 % by weight of zirconium oxide.

* * * * *